(12) United States Patent
Ruiz et al.

(10) Patent No.: US 8,788,338 B1
(45) Date of Patent: Jul. 22, 2014

(54) UNIFIED MARKETPLACE FOR ADVERTISEMENTS AND CONTENT IN AN ONLINE SYSTEM

(71) Applicant: Yahoo! Inc., Sunnyvale, CA (US)

(72) Inventors: Bruno Fernandez Ruiz, Sevenoaks (GB); Scott J. Gaffney, Menlo Park, CA (US); Jean-Marc Langlois, Menlo Park, CA (US); Prabhakar Krishnamurthy, Pleasanton, CA (US); Aharon Lavi, Mobile Post Misgav (IL)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/932,766

(22) Filed: Jul. 1, 2013

(51) Int. Cl.
G06Q 30/00 (2012.01)
G06Q 30/02 (2012.01)

(52) U.S. Cl.
CPC .................................. *G06Q 30/0277* (2013.01)
USPC ...................................................... 705/14.41

(58) Field of Classification Search
CPC ....................................................... G06Q 30/02
USPC ...................................................... 705/14.41
See application file for complete search history.

(56) References Cited

U.S. PATENT DOCUMENTS

| | | | |
|---|---|---|---|
| 6,078,866 A | 6/2000 | Buck et al. | 702/2 |
| 6,269,361 B1 | 7/2001 | Davis et al. | 707/3 |
| 6,826,572 B2 | 11/2004 | Colace et al. | 707/10 |
| 6,978,263 B2 | 12/2005 | Soulanille | 707/3 |
| 7,065,500 B2 | 6/2006 | Singh et al. | 705/26 |
| 7,076,479 B1 | 7/2006 | Cheung et al. | 707/3 |
| 7,100,111 B2 | 8/2006 | McElfresh et al. | 715/517 |
| 7,225,182 B2 | 5/2007 | Paine et al. | 707/3 |
| 7,231,358 B2 | 6/2007 | Singh et al. | 705/14 |
| 7,454,409 B2 | 11/2008 | Roy et al. | 707/3 |
| 7,941,340 B2 | 5/2011 | Doemling et al. | 705/14.72 |
| 8,321,274 B2 | 11/2012 | Collins et al. | 705/14 |
| 2003/0101126 A1 | 5/2003 | Cheung et al. | 705/37 |
| 2004/0186769 A1 | 9/2004 | Mangold et al. | 705/14 |
| 2005/0028188 A1* | 2/2005 | Latona et al. | 725/13 |
| 2005/0165638 A1 | 7/2005 | Piller | |
| 2006/0111971 A1 | 5/2006 | Salesin et al. | |
| 2007/0027743 A1* | 2/2007 | Carson et al. | 705/10 |
| 2007/0265073 A1* | 11/2007 | Novi et al. | 463/35 |
| 2008/0201218 A1 | 8/2008 | Broder et al. | |
| 2008/0249852 A1 | 10/2008 | Ting et al. | |
| 2009/0183112 A1 | 7/2009 | Higgins et al. | |
| 2010/0058383 A1 | 3/2010 | Chang et al. | |
| 2011/0029384 A1 | 2/2011 | Wei et al. | 705/14.53 |
| 2011/0054960 A1 | 3/2011 | Bhatia et al. | |
| 2011/0276389 A1* | 11/2011 | Kulkarni et al. | 705/14.42 |
| 2011/0313853 A1 | 12/2011 | Ramer et al. | |
| 2012/0158511 A1 | 6/2012 | Lucero et al. | |

OTHER PUBLICATIONS

Extended European Search Report issued in European Patent Application No. 13 193 381.4, dated Jun. 2, 2014, 5 pages.

\* cited by examiner

*Primary Examiner* — Sun Li

(74) *Attorney, Agent, or Firm* — Brinks Gilson & Lione

(57) ABSTRACT

A server system of an online information system displays advertising items and content items retrieved from storage devices as a stream viewable by a user on a user device. The advertisement items and the content items are ordered in the stream by a ranking score computed for each of the advertisement items and each of the content items. The server system transmits a web page including the stream to a user device over a network. In this manner, advertising items and content items compete in a unified marketplace for inclusion in the stream for viewing by the end user.

18 Claims, 4 Drawing Sheets

UNIFIED MARKETPLACE FOR ADVERTISEMENTS AND CONTENT IN AN ONLINE SYSTEM

BACKGROUND

This application relates generally to data processing systems. More particularly, this application relates to systems and methods for displaying revenue-generating information such as advertisements and non-revenue-generating information such as content together online.

Online advertising has become increasingly popular as a way for advertisers to publicize information about goods and services to potential customers and clients. An advertiser can implement an advertising campaign using internet-accessible facilities of online providers such as Yahoo! Inc. The online provider serves to connect the advertiser with users accessing online resources such as search engines and news and information sites. Advertisements ("ads") of the advertiser are provided to the users to inform and attract the attention of the users.

Some online providers provide a stream of content and other information on a web page. The web page may be accessed by users on devices such as desktop computers, portable computers such as laptops and handheld devices such as tablets and smartphones, or media devices such as televisions. The stream is presented on the web page as a sequence of items displayed, one item after another, for example, down the web page when viewed on the display of a device. In some cases, the stream may be updated with new content at the top or bottom of the page upon certain events, such as the elapse of a certain period of time, the scrolling of a mouse, or the click of a spacebar.

Advertising items, also referred to herein as "stream ads," are inserted into the stream of content, supplementing the sequence of items. Stream ads may be formatted to visually match the surrounding stream of content so as to appear native to the stream. Alternatively, stream ads may be formatted to complement the surrounding stream of content so as to be more eye-catching.

Streams are becoming common in online presentation in part because they provide added flexibility for web site designers and advertisers. If a stream is not used to present data on a web page, the web page must have pre-defined sections. Only certain types of information, having specified sizes, shapes or content, can be presented in the pre-defined sections. A stream allows any number and size and shape of content to be included. A stream also lowers the cognitive load on the viewer when processing information associated with different items of content or advertisements by removing the cognitive overhead associated with switching to a different visual format or perspective.

It is desirable to manage the flow of content and advertisements in a stream in order to, in turn, manage the experience of users and advertisers who interact with the online provider. Further limitations and disadvantages of conventional and traditional approaches will become apparent to one of skill in the art, through comparison of such systems with some aspects of the disclosure set forth in the remainder of the present application with reference to the drawings.

BRIEF SUMMARY

In accordance with the systems, products and methods disclosed here, an online provider may control the location, number and spatial and temporal frequency of stream ads in a stream of content viewable by a user on a web page. The stream may be viewed as a unified marketplace in which both revenue-generating items and non-revenue-generating items such as advertising items and content items, respectively, compete for presentation in the stream. Scoring, ranking, and pricing techniques permit commensurate treatment of all items (whether revenue generating for the online provider or not). Additional business rules for content items and advertising items provide further degrees of freedom for the online provider in determining how content items and advertisement items are presented in a stream.

For the online provider, controlling the location, number and frequency of ads in a stream can help manage the experience of users and of advertisers with the web site of the online provider. Providing too many ads can result in a less satisfying experience for a user. Providing too few ads can reduce or eliminate advertiser involvement with the web site. Selecting the most appropriate content items and advertisement items for the user can keep the user engaged with the web site and ensure the user will return to the web site. User engagement in turn drives the confidence and involvement advertisers who place stream ads on the web site. The present disclosure generally describes a unified marketplace in which every item of information presented by an online provider, from revenue generating advertisements to paid content, is scored, priced according to explicit or implicit bids, and ranked for presentation in a unitary format, such as a stream.

DETAILED DESCRIPTION

Figure 1:
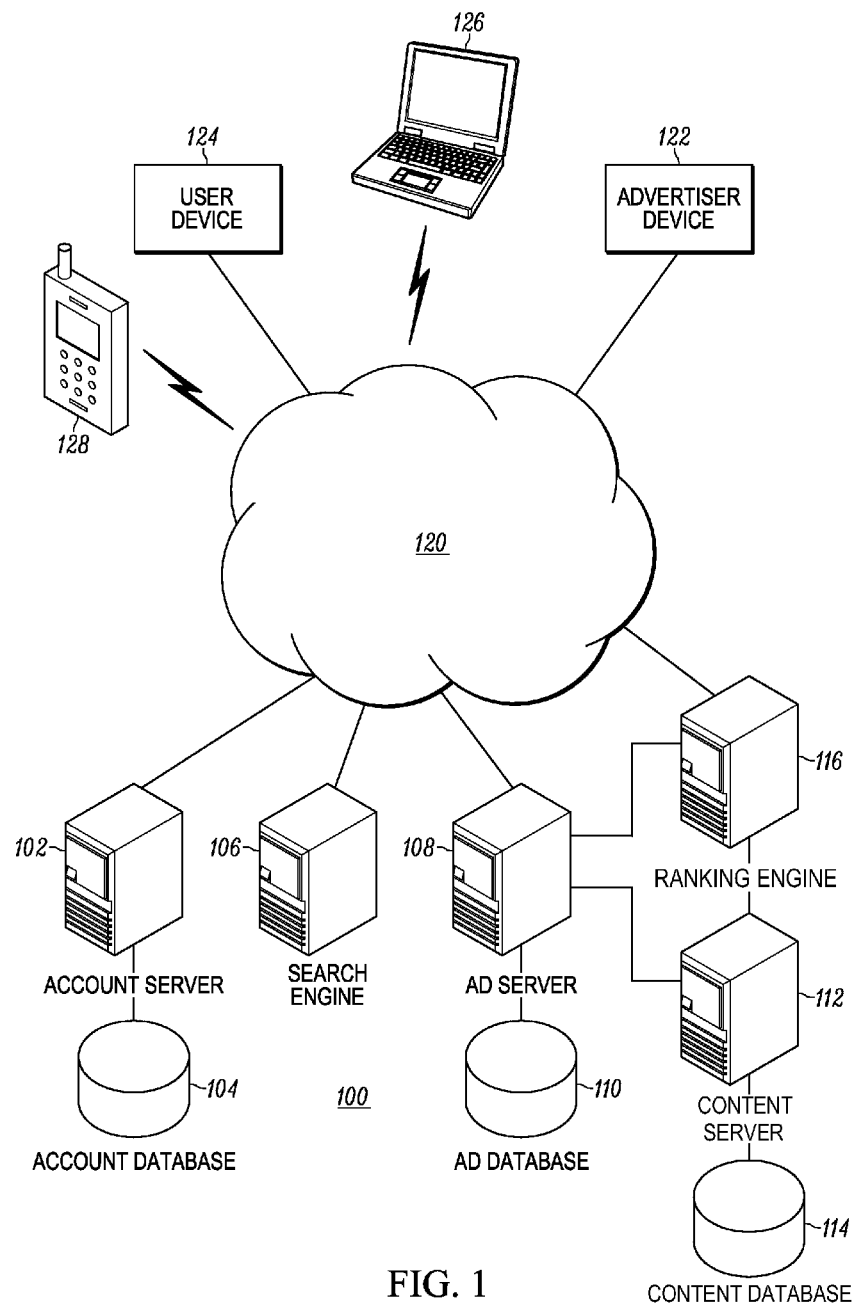
FIG. 1 is a block diagram of an example online information system.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

An online information system places advertisements of advertisers within content services made available to end users, such as web pages, mobile applications ("apps"), TV apps, or other audio or visual content services. The advertisements are provided along with other content. The other content may include any combination of text, graphics, audio, video, or links to such content. The advertisements are conventionally selected based on a variety of criteria including those specified by the advertiser. The advertiser conventionally defines an advertising campaign to control how and when advertisements are made available to users and to specify the content of those advertisements.

Streams are becoming common in online presentation because they provide flexibility for content providers who source content items for the stream, advertisers who source advertising items for the stream and for the online provider who combines the content items and the advertising items to produce the stream. A stream allows any number and size and shape of content items and advertising items to be included in the stream. The elements of the stream may be sorted by relevance or by any suitable parameter. A stream also lowers the cognitive load on the viewer when processing when processing information associated with different items of content or advertisements by removing the cognitive overhead associated with switching to a different visual format or perspective.

The stream may be viewed as a unified marketplace where content items and advertising items compete for placement or inclusion in the stream. The participants in the marketplace are advertisers who sponsor or provide the advertising items and content providers who sponsor or provide the content items. The stream and the marketplace may be hosted or managed by an online provider such as Yahoo! Inc. The online provider may also provide ads for its own products and services or its own content items to the stream.

Advertisers interact with equipment of the online provider to create or provide online advertisements. The online advertisements include advertising content stored in a database or other memory in association with identification of the advertiser and one or more bid amounts. The advertising content may include text or graphics or both and a link to a landing page to which the user's browser is redirected upon clicking the link. The bid amount represents an amount of money the advertiser will pay upon an event pertaining to the advertisement. The event may be an impression or viewing of the advertisement by a user, a click through or other selection of the advertisement by the user viewing the advertisement, or an action following viewing the advertisement such as providing credit card information or an email address. The bid amount may be used for determining position of the advertisement in the stream in a manner to be described below. The online advertisement may include other data as well including data defining how the advertisement will appear in the stream.

The content items include information on a topic that may be of interest to a user. This information may include a link to another web page providing more information about the topic and a summary of information about the topic. In some embodiments, a content provider will associate a bid amount with a content item. Similar to bid amounts for advertisements, the bid amount for a content item may be based on an impression, a click through, or another action. Also, the bid amount may be used for determining position of the content item in the stream in a manner to be described below. Alternatively, a software based bidding agent may be employed to automatically bid on behalf of content items.

The content items and advertisement items are in competition for inclusion in the stream. The competition for slots in the stream may be cleared using a Generalized Second Price (GSP) auction mechanism. In a GSP auction, the highest bidder gets the first slot, the second highest bidder gets the second slot and so. However, the highest bidder then pays the price bid by the second highest bidder. This is similar to a sponsored search marketplace although the bids in sponsored search are expressed differently and the competition in a sponsored search marketplace is only between advertisements.

In one embodiment, an advertiser provides targeting predicates, an ad snippet and a bid. In some embodiments, the advertiser can provide a budget across multiple triples, referred to as targeting triples. Targeting predicates may be based on any type of market segment of interest to advertisers, including in one example, demographic markets, market segments based gender or age, behavioral segments based on user profile information, or geographic markets. The bids may be cost per click (CPC) bids, cost per impression (CPM) bids or cost per action (CPA) bids. The online provider may choose not to support all bid types in all marketplaces.

What advertisers are allowed to bid for in large part determines their bidding behavior. For the online provider who manages the unified marketplace, there is a trade-off between allowing advertisers to bid for very specific targets versus allowing advertisers to bid for more broad targets.

The online provider may prefer markets that are thick with many competing advertisers to thin markets with few advertisers. The thicker the market, the greater the potential for increased revenue to the online provider. However, many advertisers are very interested in specific types of user. These narrow-focused users will likely stay out of the marketplace unless they are allowed to bid more narrowly. Broad targets lower the average value an advertiser derives since their ads may be shown to users who may not be interested in their products. Lower expected values lead to lower bids.

Some of these trade-offs can be mitigated by pricing for performance, by using excellent scoring algorithms and by preventing ads of low relevance from showing in the stream. Pricing for performance implies charging only when a user responds to an advertisement. Advertisers would prefer to pay only when users convert, such as by paying for a product or service. However, defining and tracking conversions and estimating conversions rates may be difficult to do reliably, so marketplace operators prefer charging by clicks which are more easily tracked and estimated. Charging per click can pose challenges. For example, not all clicks from users convert into sales for an advertiser. With too many clicks that do not result in a conversion, a low quality score for the ad may result.

Broad targeting requires precise scoring methods to maintain good user and advertiser experiences. Scoring is the process of assigning a value to an advertisement or content item which value can then be used for determining which item should be included in the stream. This precise scoring may require that the online provider examine not just the ad snippet but also the contents of the landing page. In some embodiments, an advertisement may include additional information such as metadata that is automatically collected or manually provided by the advertiser and used as signals to the scoring function.

Broad targeting may also add a difficulty in pricing for CPC advertisements. In pricing the advertisement, it is important to distinguish between the quality of the match between a keyword and a search term and the quality of the advertisement. The online operator may choose to discount advertisers for poor quality matches, which are the responsibility of the operator of the online marketplace which does the matching. The online operator may choose to charge a premium for poor quality advertisements which are the responsibility of the advertiser.

An exemplary system will now be described in which aspects of the unified marketplace for advertisement items and content items may be illustrated and described. Further details and optional embodiments will be provided in connection with the drawings.

FIG. 1 is a block diagram of online information system 100. The online information system 100 in the exemplary embodiment of FIG. 1 includes an account server 102, and account database 104, a search engine 106, an advertisement (ad) server 108, an ad database 110, a content database 114, a content server 112 and a ranking engine 116. The online information system 100 may be accessible over a network 120 by one or more advertiser devices such as advertiser device 122 and by one or more user devices such as user device 124. In various examples of such an online information system, users may search for and obtain content from sources over the network 120 or from the content database 114. Advertisers may provide advertisements for placement on web pages and other communications sent over the network to user devices such as the user device 124. The online information system in one example is deployed and operated by an online provider such as Yahoo! Inc.

The account server 102 stores account information for advertisers. The account server 102 is in data communication with the account database 104. Account information may include one or more database records associated with each respective advertiser. Any suitable information may be stored, maintained, updated and read from the account database 104 by the account management server 102. Examples include advertiser identification information, advertiser security information such as passwords and other security credentials, and account balance information.

The account server 102 may be implemented using any suitable device. The account management server 102 may be implemented as a single server, a plurality of servers, or any other type of computing device known in the art. Preferably, access to the account server 102 is accomplished through a firewall, not shown, which protects the account management programs and the account information from external tampering. Additional security may be provided via enhancements to the standard communications protocols such as Secure HTTP or the Secure Sockets Layer.

The account server 102 may provide an advertiser front end to simplify the process of accessing the account information of an advertiser. The advertiser front end may be a program, application or software routine that forms a user interface. In one particular embodiment, the advertiser front end is accessible as a web site with one or more web pages that an accessing advertiser may view on an advertiser device such as advertiser device 122. The advertiser may view and edit account data and advertisement data using the advertiser front end. After editing the advertising data, the account data may then be saved to the account database 104.

The search engine 106 may be a computer system, one or more servers, or any other computing device known in the art. Alternatively, the search engine 106 may be a computer program, instructions, or software code stored on a computer-readable storage medium that runs on a processor of a single server, a plurality of servers, or any other type of computing device known in the art. The search engine 106 may be accessed, for example, by user devices such as the user device 124 operated by a user over the network 120. The user device 124 communicates a user query to the search engine 106. The search engine 106 locates matching information using any suitable protocol or algorithm and returns information to the user device 124. The search engine 106 may be designed to help users find information located on the Internet or an intranet. In a particular example, the search engine 106 may also provide to the user device 124 over the network 120 a web page with content including search results, information matching the context of a user inquiry, links to other network destinations or information and files of information of interest to a user operating the user device 124, as well as a stream of content items and advertisement items selected for display to the user.

The search engine 106 may enable a device, such as the user device 124 or any other client device, to search for files of interest using a search query. Typically, the search engine 106 may be accessed by a client device via one or more servers or directly over the network 120. The search engine 106 may, for example, in one illustrative embodiment, comprise a crawler component, an indexer component, an index storage component, a search component, a ranking component, a cache, a profile storage component, a logon component, a profile builder, and one or more application program interfaces (APIs). The search engine 106 may be deployed in a distributed manner, such as via a set of distributed servers, for example. Components may be duplicated within a network, such as for redundancy or better access.

The ad server 108 operates to serve advertisements to user devices such as the user device 124. Advertisements include data defining advertisement information that may be of interest to a user of a user device. An advertisement may include text data, graphic data, image data, video data, or audio data. An advertisement may further include data defining one or more links to other network resources providing such data. The other locations may be other locations on the internet, other locations on an intranet operated by the advertiser, or any access.

For online information providers, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior.

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

Yet another approach includes targeting based on content of a web page requested by a user. Advertisements may be placed on a web page or in association with other content that is related to the subject of the advertisements. The relationship between the content and the advertisement may be determined in any suitable manner. The overall theme of a particular web page may be ascertained, for example, by analyzing the content presented therein. Moreover, techniques have been developed for displaying advertisements geared to the particular section of the article currently being viewed by the user. Accordingly, an advertisement may be selected by matching keywords/and or phrases within the advertisement and the web page. One exemplary system and method are disclosed in U.S. patent application Ser. No. 13/836,052, filed Mar. 15, 2013, pending, entitled Efficient Matching of User Profiles with Audience Segments for Audience Buy. This application is incorporated herein in its entirety by this reference.

The ad server 108 includes logic and data operative to format the advertisement data for communication to the user device. The ad server 108 is in data communication with the ad database 110. The ad database 110 stores information including data defining advertisements to be served to user devices. This advertisement data may be stored in the ad database 110 by another data processing device or by an advertiser. The advertising data may include data defining advertisement creatives and bid amounts for respective advertisements.

For example, the advertising data may be formatted to an advertising item which may be included in a stream of content items and advertising items provided to a user device. The formatted advertising items are specified by appearance, size, shape, text formatting, graphics formatting and included information, which may all be standardized to provide a consistent look for all advertising items in the stream. At least some advertising items may have an associated bid amount and may be considered to be revenue generating items. The ad server 108 then provides the advertising items to other network devices such as the ranking engine 116.

Further, the ad server 108 is in data communication with the network 120. The ad server 108 communicates ad data and other information to devices over the network 120. This information may include advertisement data communicated to a user device. This information may also include advertisement data and other information communicated with an advertiser device such as the advertiser device 122. An advertiser operating an advertiser device may access the ad server 108 over the network to access information including advertisement data. This access may include developing advertisement creatives, editing advertisement data, deleting advertisement data, setting and adjusting bid amounts and other activities.

The ad server 108 may provide an advertiser front end to simplify the process of accessing the advertising data of an advertiser. The advertiser front end may be a program, application or software routine that forms a user interface. In one particular embodiment, the advertiser front end is accessible as a web site with one or more web pages that an accessing advertiser may view on the advertiser device. The advertiser may view and edit advertising data using the advertiser front end. After editing the advertising data, the advertising data may then be saved to the ad database 110 for subsequent communication in advertisements to a user device.

The advertisement server 108 may be a computer system, one or more servers, or any other computing device known in the art. Alternatively, the advertisement server 108 may be a computer program, instructions and/or software code stored on a computer-readable storage medium that runs on a processor of a single server, a plurality of servers, or any other type of computing device known in the art.

The content server 112 is in data communication with the content database 114, the ad server 108 and the ranking engine 116. The content server 112 may access information about content items from either the content database 114 or from another location accessible over the network 120. The content server 112 communicates data defining content items and other information to devices over the network 120. This information may include content data communicated to a user device. This information may also include content data and other information communicated with a content provider operating a content provider device. A content provider operating a content provider device may access the content server 112 over the network 120 to access information including content data. This access may include developing content items, editing content items, deleting content items, setting and adjusting bid amounts and other activities.

The content server 112 may provide a content provider front end to simplify the process of accessing the content data of a content provider. The content provider front end may be a program, application or software routine that forms a user interface. In one particular embodiment, the content provider front end is accessible as a web site with one or more web pages that an accessing content provider may view on the content provider device. The content provider may view and edit content data using the content provider front end. After editing the content data, the content data may then be saved to the content database 114 for subsequent communication to a user device.

The content server 112 includes logic and data operative to format content data and other information for communication to the user device. For example, the content data may be formatted to a content item which may be included in a stream of content items and advertisement items provided to a user device. The formatted content items are specified by appearance, size, shape, text formatting, graphics formatting and included information, which may all be standardized to provide a consistent look for all content items in the stream. In some embodiments, the content items have an associate bid amount which may be used for ranking or positioning the content items in a stream of items presented to a user device. In other embodiments, the content items do not include a bid amount or the bid amount is not used for ranking the content items. Such content items may be considered to be non-revenue generating items. The content server 112 then provides the content items to other network devices such as the advertising server 108 and the ranking engine 116.

The ranking engine 116 is in data communication with the ad server 108, the ad database 110, the content server 112 and the content database 114. The ranking engine 118 is configured to identify items to be included in a stream of content items and advertising items to be provided to a user device such as user device 124. The ranking engine 118 may thus be configured to determine which advertising items and which content items are qualified to be included in the stream and to score and to order respective advertising items and respective content items in the stream.

In one embodiment, the ranking engine 116 is configured to calculate a ranking score for each of a plurality of advertising items using bid values retrieved from the ad database 110. The ranking engine 116 is further configured to calculate a ranking score for each of a plurality of content items using bid values obtained from the content database 114. The ranking engine 116 may use other information available from the ad server 108, the ad database 110, the content server 112 and the content database 114 as well as the account database 104 when determining the ranking scores. Other embodiments and other detail of exemplary operation of the online information system 100 including the ranking engine will be described below.

The account server 102, the search engine 106, the ad server 108, the content server 112 and the ranking engine 114 may be implemented as any suitable computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

The account server 102, the search engine 106, the ad server 108, the content server 112 and the ranking engine 114 may be implemented as online server systems or may be in communication with online server systems. An online server system may include a device that includes a configuration to provide content via a network to another device including in response to received requests for page views. An online server system may, for example, host a site, such as a social networking site, examples of which may include, without limitation, Flicker, Twitter, Facebook, LinkedIn, or a personal user site (such as a blog, vlog, online dating site, etc.). An online server system may also host a variety of other sites, including, but not limited to business sites, educational sites, dictionary sites, encyclopedia sites, wikis, financial sites, government sites, etc.

An online server system may further provide a variety of services that include, but are not limited to, web services, third-party services, audio services, video services, email services, instant messaging (IM) services, SMS services, MMS services, FTP services, voice over IP (VoIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may not be under common ownership or control with the ad server 108, the content server 112 or the ranking engine 116.

The network 120 may include any data communication network or combination of networks. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network such as the network 120. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

The advertiser device 122 includes any data processing device which may access the online information system 100 over the network 120. The advertiser device 122 is operative to interact over the network 120 with the account server 102, the search engine 106, the ad server 108, the ranking engine 116, content servers and other data processing systems. The advertiser device 122 may, for example, implement a web browser for viewing web pages and submitting user requests. The advertiser device 122 may communicate data to the online information system 100, including data defining web pages and other information. The advertiser device 122 may receive communications from the online information system 100, including data defining web pages and advertising creatives.

In some embodiments, content providers may access the online information system 100 with content provider devices which are generally analogous to the advertiser devices in structure and function. The content provider devices provide access to content data in the content database 114, for example.

The user device 124 includes any data processing device which may access the online information system 100 over the network 120. The user device 124 is operative to interact over the network 120 with the search engine 106. The user device 124 may, for example, implement a web browser for viewing web pages and submitting user requests. A user operating the user device 124 may enter a search request and communicate the search request to the online information system 100. The search request is processed by the search engine and search results are returned to the user device 124. In other examples, a user of the user device 124 may request data such as a page of information from the online information processing system 100. The data instead may be provided in another environment such as a native mobile application, TV application, or an audio application. The online information processing system 100 may provide the data or re-direct the browser to another web site. In addition, the ad server may select advertisements from the ad database 110 and include data defining the advertisements in the provided data to the user device 124.

The advertiser device 122 and the user device 124 operate as a client device when accessing information on the online information system 100. A client device such as the advertiser device 122 and the user device 124 may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. In the example of FIG. 1, both laptop computer 126 and smartphone 128 may be operated as either an advertiser device or a user device.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example. A client device such as the advertiser device 122 and the user device 124 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games. The foregoing is provided to illustrate that claimed subject matter is intended to include a wide range of possible features or capabilities.

Figure 2:
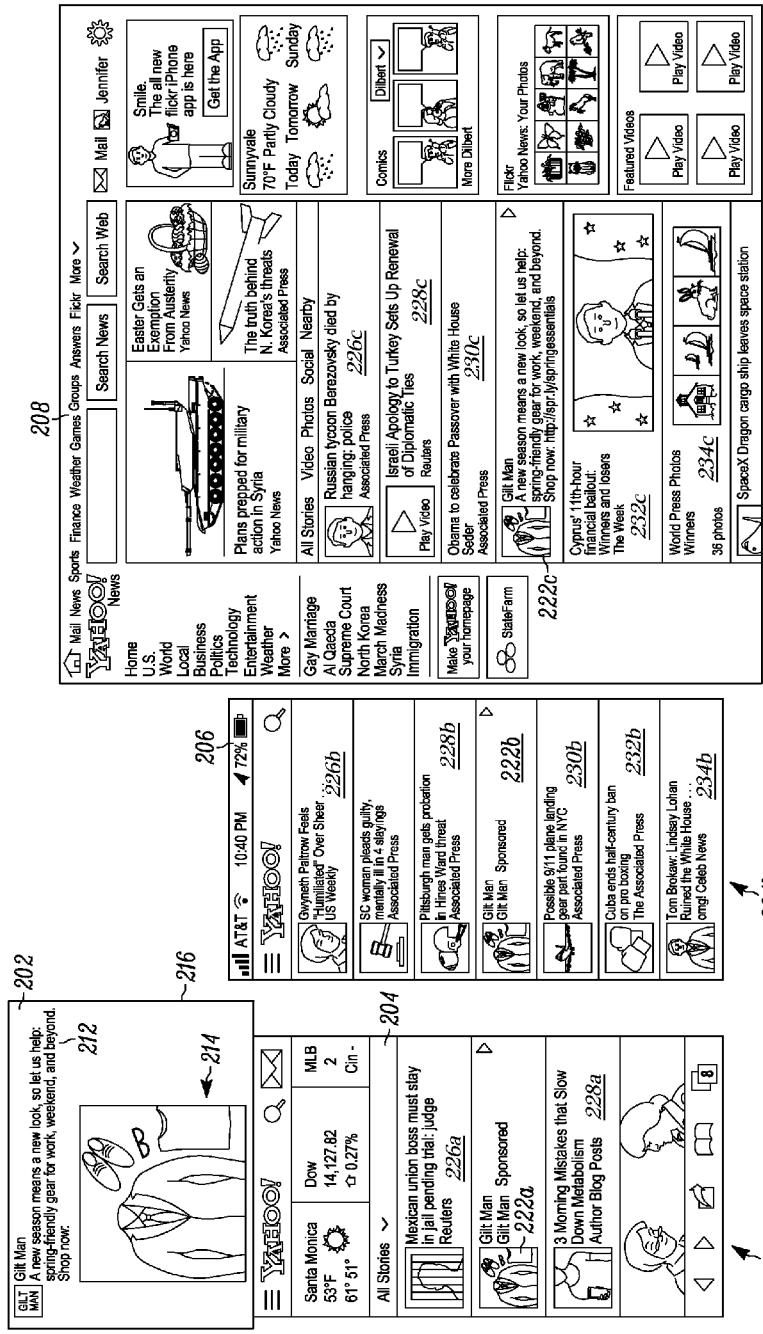
FIG. 2 is an example illustrating a display ad as modified for display in a stream display.

FIG. 2 illustrates streams of content items and data items displayed on selected user devices. In FIG. 2, a display ad 202 is illustrated as displayed on a variety of displays including a mobile web device display 204, a mobile application display 206 and a personal computer display 208. The mobile web device display 204 may be shown on the display screen of a mobile handheld device such as a smartphone. The mobile application display 206 may be shown on the display screen of a portable device such as a tablet computer. The personal computer display 208 may be displayed on the display screen of a personal computer (PC).

The display ad 202 is shown in FIG. 2 formatted for display on a user device but not as part of a stream to illustrate an example of the contents of such a display ad. The display ad 202 includes text 212, graphic images 214 and a defined boundary 216. The display ad 202 is developed by an advertiser for placement on a web page sent to a user device operated by a user. The display ad 202 may be placed in a wide variety of locations on the web page. However, the defined boundary 216 and the shape of the display ad must be matched to a space available on a web page. If the space available has the wrong shape or size, the display ad 202 may not be useable.

To overcome these requirements and limitations, the display ad 202 may be reformatted or alternately formatted for inclusion in a stream of content items and advertising items including a stream ad incorporating contents of the display ad 202.

In these examples, the display ad is shown as a part of streams 224a, 224b, and 224c. The streams 224a, 224b, 224c include a sequence of items displayed, one item after another, for example, down a web page viewed on the mobile web device display 204, the mobile application display 206 and the personal computer display 208. The streams 224a, 224b, 224c may include any type of items. In the illustrated example, the streams 224a, 224b, 224c includes content items and advertising items. For example, stream 224a includes content items 226a and 228a along with advertising item 222a; stream 224b includes content items 226b, 228b, 230b, 232b, 234b and advertising item 222b; and stream 224c includes content items 226c, 228c, 230c, 232c and 234c and advertising item 222c. Each of the streams 224a, 224b, 224c may include any number of content items and advertising items. In one embodiment, the streams 224a, 224b, 224c may be arranged to appear to the user to be an endless sequence of items so that as a user of a user device on which one of the streams 224a, 224b, 224c is displayed scrolls the display, a seemingly endless sequence of items appears in the displayed stream.

The content items positioned in any of streams 224a, 224b, 224c may include news items, business-related items, sports-related items, etc. Further, in addition to textual or graphical content, the content items of any stream may include other data as well, such as audio and video data or applications. Each content item may include text, graphics, other data, and a link to additional information. Clicking or otherwise selecting the link re-directs the browser on the user's device to a web page referred to as a landing page that contains the additional information.

Stream ads like the advertising items 222a, 222b, and 222c may be inserted into the stream of content, supplementing the sequence of related items, providing a more seamless experience for end users. Similar to content items, the advertising items may include textual or graphical content as well as other data such as audio and video data or applications. Each advertising item 222a, 222b, and 222c may include text, graphics, other data, and a link to additional information. Clicking or otherwise selecting the link re-directs the browser on the user's device to a web page referred to as a landing page.

While the exemplary streams 224a, 224b, 224c are shown with a single visible advertising item 222a, 222b, 222c, respectively, any number of advertising items may be included in a stream of items. Conventionally, it has been known to position the advertising items at fixed locations. For example, in one conventional system, it was known to position an advertising item at the third item in the stream, counting from the top, at the sixteenth item in the stream and at every thirteenth item in the stream thereafter. That is, in the conventional system, advertisements are located in pre-defined slots in the stream. Slotting of the advertisements is the same for all users under all conditions. In this regard, advertisements and content items are complements in the stream. If a content item is not placed at a designated slot in the stream, an advertisement is placed in that slot.

In accordance with one aspect of the illustrated embodiment, slotting of advertisements in a stream is made dynamic. Any slot in the stream is subject to competition between advertising items and content items. A score is determined for each respective item. The scores for the advertising items and the content items are made commensurate so that advertising items and content items may be ranked against each other and the ranking used to populate the stream. Techniques for ranking the advertising items and content items are discussed in further detail below.

Figure 3:
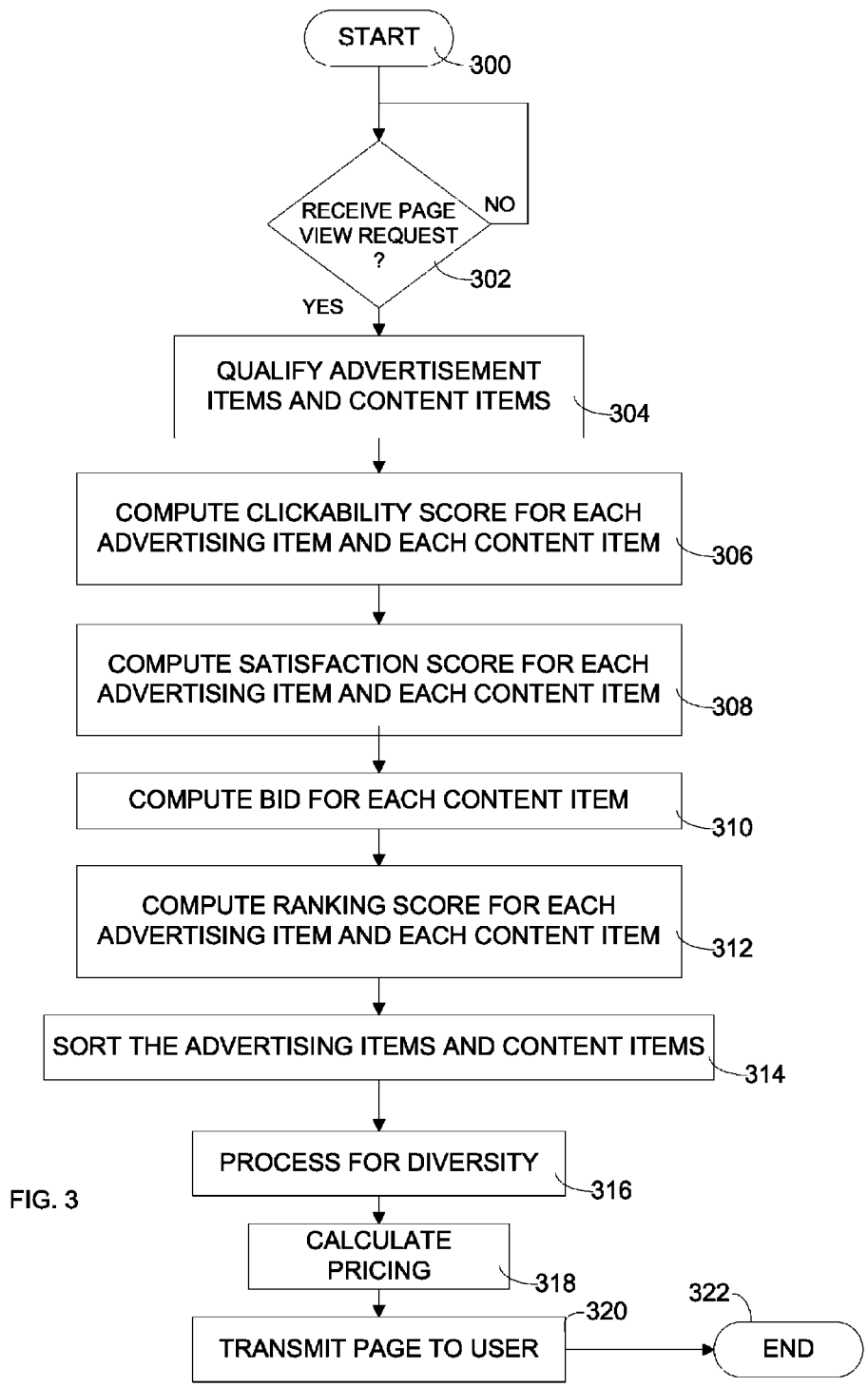
FIG. 3 is a flow diagram illustrating one embodiment a method for ranking and displaying a stream of advertising items and content items in an online information system.

FIG. 3 is a flow diagram illustrating one embodiment a method for ranking and displaying a stream of advertising items and content items in an online information system. The method of FIG. 3 may be performed by, for example, elements of the online information system 100 of FIG. 1 including the account server 102, the search engine 106, the ad server 108, the content server 112 and the ranking engine 114. In other embodiments, other components may be involved in performing the method of FIG. 3 and some of the steps illustrated for the method of FIG. 3 may be omitted or reordered and different steps may be added or substituted.

The method begins at block 300. At block 302, the method waits in a loop for receipt of a page view request. A page view request is a data communication received over a network such as the network 120 of FIG. 1. The data communication includes data specifying a web page to view. For example, the page view request may specify the uniform resource locator (URL) for an online provider such as Yahoo! including the URL yahoo.com. The requested web page is one which may be populated in full or in part by a stream including items of at least two different types. In the examples shown here, the types of items included in the stream are content items and advertising items, generally as shown in the example embodiment of FIG. 2. However, in other embodiments, other types of items may be provided in a stream, and the types of items or categories of items may be selected according to any convenient or useful criteria. For example, instead of populating a stream with content items and advertising items as shown in FIG. 2, a stream may be populated with sports-related items of content and news-related items of content. In another example, instead of just two types of items being scored and ranked together such as content items and advertising items, more than two items may be scored and ranked, including content items, CPC advertising items and CPM advertising items. The method illustrated in FIG. 3 may be extended to the widest variety of combinations.

After a page view request has been received, at block 304, advertisement items and content items are qualified so that only qualified items are the subject of further processing. Items selected for qualification are contained, in one example, in the ad database 110 and the content database 114 of the online information system 100 of FIG. 1.

Qualification may be performed on any suitable basis using any suitable inputs. For example, advertising items and content items may be qualified based on identification information for a user from whom the page view request is received. If the online information system already stores information about interests and preferences of the identified user, that information may be used to qualify advertising items and content items. Also, if advertisers have specified targeting constraints, such as gender, age and geography, those constraints may be applied to information known about the user to qualify advertising items and content items. Still further, if the page request includes information specifying a device type or platform of the user device, such as smartphone or tablet or desktop computer, that platform information may be used to qualify advertising items and content items for further processing. Some content providers may limit the content items they will send to particular platforms or format the content items to a particular format based on the platform information. Similarly, some advertisers may direct particular advertisement items only to desktop computers or tablet computers. Once the content items and advertising items have been qualified, processing continues to block 306.

At block 306 a clickability score is computed for each advertising item and a clickability score is computed for each content item. Clickability is a measure of how many more clicks a given advertising item or content item gets compared to the average advertising item or content item. In one example, clickability is a function of number of clicks an advertising item or content item receives for all users and number of impressions or views an ad receives for all users, and the click through rate (CTR) for the advertising item or the content item for all users. Clickability is position independent.

Click through rate is defined as the ratio of clicks to impressions an advertising item or content items receives. Click through rate may be determined dynamically using stored data such as statistical data about performance of advertisements in the online information system. For example, each time a particular advertising item or a particular content item is displayed or viewed by an advertiser, a data item representing views or impressions for that item is incremented. Similarly, each time a particular advertising item or a particular content item is clicked or otherwise selected by a user, a data item representing clicks or click throughs for that item is incremented. Data items may be stored in an ad database, a content database or any other suitable storage device such as the ad database 110 and the content database 114 of FIG. 1. Similarly, mathematical processing may be performed, for example, by the ad server 108, the content server 112 or the ranking engine 116 of FIG. 1.

In one example, click through rate CTR is defined as $$CTR = \frac{\sum C_{i,t} e^{-\gamma t}}{\sum V_{i,t} e^{-\gamma t}}$$

where $C_{i,t}$ represents the number of click throughs an advertising item or a content item receives at a particular position i over time t. Time t represents a discrete increment of time, the width of which may vary. Typically, each increment of t corresponds to seconds or minutes. The position i refers to the position in the stream with i=1 representing the first slot, i=2 the second, etc. In one embodiment, $V_{i,t}$ represents the number of views or impressions the advertising item or content item receives at a particular position i over time t. In another embodiment, $V_{i,t}$ represents the sum of clicks and skips for a position i at time t. A skip for position i may be counted whenever a user clicks on an item in a position below position i, or may be adjusted by a coefficient to register a fractional count. For example, if a user clicks on i=4, positions i=1, 2, 3 have skip counts incremented at the same time that position i=4 has its click count incremented. The exponential term with coefficient gamma ($\gamma$) specifies a decay rate, which is typically longer for ad items than for content. The exponentials introduce time-dependence so that, if an event such as a click or view occurred recently in the past, it is given more weight than older events.

In an embodiment, the coefficient gamma ($\gamma$) may be computed or adjusted based on periodic comparisons of the click through rate of a given item j at position i and time t+1 against the reference click through rate and clickability for the same item j at the same position i in the immediately preceding time increment—e.g., by plotting refCTR(i)*clickability(j,t) against CTR(i, j, t+1). The refCTR and clickability functions are further described below. In another embodiment, gamma (γ) is computed by summing and then minimizing the error:

$$\gamma = \sum V_{i,t}[refCTR(i) * \text{clickability}(j, t) - CTR(i, j, t+1)]^2$$

For computing click through rate, the following decomposition is assumed for both advertising items and content items:

CTR(ad/content,user,position,configuration)=Clickability(ad/content,user)*refCTR(position,configuration)

Thus, click through rate CTR is specified for a particular advertising item or content item, particular user, particular position in the stream and particular device configuration. Examples of device configurations include a handheld device, a tablet and a desktop computer. Other configurations and technologies may be accommodated as well and may be used to characterize CTR or other user data. The relationship between clickability and click through rate is specified by a reference curve, refCTR, which varies with position of the content item or the advertising item in the stream and user device configuration. Clickability thus explicitly represents a position-independent CTR.

As a corollary, refCTR represents the probability that a user will click on a particular advertising item or a particular content item at a particular position i, independent of any effect on click through rate of the desirability (or undesirability) of particular advertising or content items. This refCTR may be computed by running a random bucket showing click through rates for random advertising items or content items across all positions, with the same proportion of advertising/content as in the main bucket.

The value of clickability for an advertising item or content item is desired to be position independent. Clickability eliminates any effect of position in the stream of a content item or an advertising item and focuses instead on the quality of the content item or the advertising item.

Turning back to step 306 of FIG. 3, a clickability score for an item i in the stream may therefore be computed using the following general relation:

$$\text{Clickability}(i) = \frac{\sum_i C_{it} e^{-\gamma t}}{\sum_i V_{it} e^{-\gamma t} * RefCTR(i)}$$

In some embodiments, however, it may be desirable to estimate or measure the clickability for an item specific to particular users or a particular market segment, which may be given an arbitrary index label j. In such embodiments, clickability may be computed based on a relation specific to user or market segment $$\text{Clickability}(i, j) = \frac{\sum_i C(i, j)}{\sum_i V(i, j) * RefCTR(i, j)}$$

Thus, in various embodiments, to determine clickability, one may sum clicks over all positions and divide by the product of views or impressions at all positions and refCTR.

In some embodiments, personalization is then introduced as an extra factor, which contributes to the overall click through rate for a given item, user/segment, position, and device configuration:

CTR(ad/content,user/segment,position,config)=
  refCTR(position,configuration)*Clickability(ad/content,user/segment)*Affinity(ad/content,user/segment)

For content items, the Affinity between user and content is estimated from historical data using the number of clicks observed for this user on content items with similar content features (with similarity determined using algorithmic analyses of similarity to context or known content taxonomies, for example), normalized by the number of observed clicks from the reference user segment. In one embodiment, this is done using a Naive Bayes approximation. Many months of user historical data may be used for reliably estimating this affinity for content items.

For advertising items, the affinity between user and an advertisement may be more difficult to estimate from historical data. The user buy intent with respect to an advertised product or service is probably not as long lived as the user's general interest in a content item such as a news story. Therefore, a shorter historical window may be used for advertising items. The exponential variation using gamma (γ) is introduced to adjust the time window for which the quantity is being computed. The historical data for advertising items also tends to be much more sparse. In some embodiments, search history profiles, mail, or other application activities may be used to expand the pool of user behaviors. Regardless of the source of data, once the data is collected, an affinity score is computed by rendering both user data and items in a high-dimensional vector space defined by recognized features within an existing content network or taxonomy. Description of such renderings are provided in co-pending U.S. patent application Ser. No. 13/839,169, entitled "Method and System for Multi-Phase Ranking for Content Personalization," and Ser. No. 13/837,357, entitled "Method and System for User Profiling Via Mapping Third Party Interests to a Universal Interest Space," both of which are incorporated by reference herein in their entirety.

After clickability is computed for each advertising item and each content item at block 306, at block 308, a satisfaction score is computer for each advertising item and each content item. Satisfaction may also be referred to as post-click satisfaction and is defined by some measure of user satisfaction after the user has interacted with the advertising item or the content item. Clickability generally only measures the propensity of a user to click on an advertising item or a content item. Satisfaction assigns a numerical value to the user's likelihood to return to the online provider or the marketplace based on the user's overall experience. In one example, satisfaction may be set to a value between 0 and 1 where 1 indicates complete user satisfaction and willingness to return and 0 indicates complete user dissatisfaction and a lost user who is unlikely to ever return.

In some examples, satisfaction can be estimated for an advertising item using conversion data. However, such data is relatively sparse and may not be reliably compared across advertising items. In another example, dwell time may serve as a measure of satisfaction. Dwell time is an indication of the amount of time a user views a clicked-on advertisement after clicking on an advertising item views content after clicking a content item. In some embodiments, where insufficient data makes estimation unreliability, satisfaction may be set to a constant value such as 1.0 for content items, advertising items or both.

In other embodiments, an additional factor for popularity may be included in the CTR model:

CTR(ad/content,user/segment,position,config)=
refCTR(position,configuration)*Clickability(ad/
content,user/segment)*Affinity(ad/content,user/
segment)*Popularity(ad/content,user/segment)

The popularity score reflects a measure of overall interest in a particular item within a window of time. The popularity score may be computed, for example, based on a simple ranking of the highest click through rates for ads or content within a window of time. The ranking is then normalized and adjusted by a coefficient reflecting the relative importance of Popularity to the overall CTR.

At block 310, a bid amount for each content item is computed. For advertising items, a bid amount is set by the advertiser and is stored, for example, in the ad database with the rest of the data defining the ad. For content items and advertising items to be ranked together for inclusion in the stream, there must be an analog to the bid amount of an advertising item for a content item. In some embodiments, content providers may provide a bid amount if they are participating in the unified marketplace. In other embodiments, though, no content bids may exist. Until publishers and other content providers explicitly bid to position their content items in the stream, an automatic method may generate bids that allow ranking of content items and advertising items together. In still other embodiments, content bids may reflect actual amounts paid to content contributors who are partnered with an online provider.

One example for determining content bids is shown here. For each user or user-segment, Table 1 below may be constructed. Here user-segment can be based on the targeting profile of the user (i.e. the combination of user segments that the advertiser can bid for). That is, if data for a given user is not available, data for the table can be obtained at an aggregate level based on user segments.

TABLE 1

| Quality-Score ($q_c$) | Percentile | Historical bid ($b_a$) | Transformed Historical Bid ($f[b_a]$) (values below for m = 0.7) |
|---|---|---|---|
| 0.05 (min value of $q_c$ allowed) | 0 | $0.10 (min value of bid allowed) | $0.3 |
| 0.15 | 10 | $0.25 | $0.5 |
| 0.87 | 90 | $1.50 | $1.76 |
| 1.0 (max value of $q_c$) | 100 | $100 (max possible bid) | $100 |

Table 1 stores percentile values for content-quality score and historical bids on ads. These percentiles are not impression-weighted. Thus the percentile distribution of quality-scores is over the set of unique content items just as the distribution of bids is over the set of unique ads. The percentile score may be obtained by selecting all content items in the ad database which are qualified for the user, the ranking the selected content items by quality score. The ranked, selected items are then segregated according to their tenth percentile, twentieth percentile, etc. Other techniques may be used as well. Thus, the table translates quality score for content into a bid for content. In this manner, the quality score and the bid data are independent for content items and advertising items. Quality score for contents and bid data for ads is paired or correlated based only on relative percentile.

In other embodiments of the unified marketplace, ads and content may be paired, correlated, or synchronized in other ways. For example, ads and content may be bundled based on similar subject matter in order to fit to an estimated overall clickability for the bundle, which is calibrated to preserve the quality of end user experience.

The Quality Score entered in Table 1 in one embodiment is a function of clickability and post-click satisfaction. One technique for calculating Quality Score is described below in conjunction with FIG. 4. The historical period of the data may be restricted to 'd' days (where 'd' is an external parameter). The right-most column of Table 1 carries a transformation of the historical bid. An exemplary transformation function for bid amounts that may be used is the following:

$$\left(ba[\max] - ba[\min] * \left(\frac{ba - ba[\min]}{ba[\max] - ba[\min]}\right)^m\right)$$

where m∈(0 ... M) where M is an input parameter. Values m<1 give advantage to content items and values m>1 give advantage to advertising items. Typically m would have a value of approximately 1. Data in Table 1 can be updated every day by the online provider.

After content-items have been selected for the stream, upon a page view event, step 310 of the exemplary method of FIG. 3 includes a lookup for each content-item from the table by using the Quality Score $q_c$ as a key to the table. If an entry for $q_c$ is found, look up the corresponding bid $b_a$ from the third column. If $q_c$ is not found, the find the immediately higher score with an entry in the table, designated $q_c^h$. Then find the bid in the table which corresponds to $q_c^h$, $b_a$. The transformed historical bid can then be computed as $b_c = k*f[b_a]$, where k is an external parameter.

Thus, the bid for the content item is determined using the bid for an advertising item. This technique is exemplary only, but it ensures that bids automatically determined for content items are commensurate with bids for advertising items and that each content item will get a unique bid. These benefits are important for ranking the content items for inclusion in the stream. Moreover, the bid for a content item is proportional to its quality score. Thus, only high-quality advertising items, with high quality scores, will rise to the top of the stream and at the same time, content items with low quality scores will not displace high-quality advertising items. Since the content bid is proportional to the quality score, it reflects both long-term user value as well as immediate short term revenue. Still further the content bid is proportional to the monetary value of the user since it can be safely assumed that advertisers' bids reflect the value of the user. Finally, the illustrated technique is adaptive. That is, as bids on advertising items increase, bids on content items will increase as well. Up to a point, this will induce advertisers to bid more.

The external parameters k and m may be chosen in any suitable manner. In one example, the parameters may be chosen so that most the time, content items get the top slots in the stream, advertising items are interspersed with content items and not clustered together. Also, the marketplace should achieve some level of stability after an initial boot up phase. This implies advertisers should not have to constantly increase their bids on their advertising items to hold their slots. One exception to this rule is when the marketplace is growing and new advertisers are entering the marketplace.

At block 312, a ranking score is computed for each advertising item and for each content item. For content items, in one embodiment, ranking-score$_s = b_s * c_s * s_c$ where $b_c$ is the computed bid for the content item, $c_c$ is the clickability for the content item and $s_c$ is the satisfaction score for the content item. For advertising items, in one embodiment, $$\text{ranking-score} = b_a * c_a * s_a$$

where $b_a$ is the advertiser-specified bid for the advertising item, $c_a$ is the clickability for the advertising item and $s_a$ is the satisfaction score for the advertising item.

After computing the ranking score at block 312, at block 314, the advertising items and the content items are sorted using their computed ranking scores. Because the ranking scores have been computed using similar values, the ranking scores are commensurate and may be reliably be interlaced. The result of the sorting is a blended slate of advertising items and content items.

Following the sorting step, the blended slate may be used to populate the stream. However, in some embodiments, it may be preferred to process the blended slate for diversity, block 316. Diversity is applied to content to prevent too many similar content items to be located near each other. An example is news articles on the same topic that may be ranked close to each other. Only content items are affected by diversity processing and it will cause some content items to drop in rank.

One example of a diversity algorithm includes, first, ordering the content items by ranking-score ($b_c * c_c * s_c$) so that position 1 corresponds to the highest score. Second, comparing the content items in position 2-N, where N is in the range 200-300, against the content item in position 1. Third, if any item in positions 2-N matches any features of the item in position 1, then multiply the item's ranking-score by a diversity score, such as a value in the range [0-1] that depends on feature type. Fourth, the content items in positions 2-N may be sorted using the new ranking scores penalized with diversity against the content item in position 1. Fifth, steps two through four may be repeated for content items in positions 3-N in comparison with the content item in position 2. And sixth, step five of repeating for items in positions 3-N may be repeated, for example, a minimum of 20 times.

In addition to processing content items for diversity, particular rules may be applied to advertising items following the sorting step, as well. For example, in one embodiment, rules may be applied as guard rails, preventing advertising items from being positioned in slots 1 and 2 of the stream. If an advertising item is in either of the first two positions following the sorting process, the advertising item may be automatically moved to a lower position such as slot 3. In another embodiment, a rule is established to maintain at least 9 content items between each advertising item in the stream. If fewer than 9 content items occur between two advertising items, the lower-ranked advertising item may be automatically moved to a lower position. Other values may be chosen for these rules, other rules may be established as well.

At block 318, pricing is calculated for advertising items and content items. Pricing refers to the amount an account of an advertiser associated with an advertising item is charged in response to selection of the advertising item by a user, such as by a click through. Similarly, pricing for a content item refers to the amount an account of a publisher or content provider associated with a content item is charged in response to selection of the content item by a user, such as by a click through of that content item.

In one embodiment a rule known as Generalized Second Price (GSP) is adopted for block 318. Under this rule, if an advertising item was clicked on or otherwise selected by a user, the advertiser associated with the advertising item will be charged an amount which is equal to the minimum bid required to win that position. Specifically, let i denote the advertising item a under consideration, and let i+1 be the content item or advertising item in the position right below advertising item a. Then, the price that the advertiser associated with advertising item a will be charged, if clicked, will be the maximum of a specified reserve price for item i $r_i$ and the quotient of the product of bid, clickability, and satisfaction for the item at i+1 and the clickability and satisfaction for the item at i:

$$p_i = \max\left[\left(\frac{b_{i+1} * c_{i+1} * s_{i+1}}{c_i * s_i}\right), r_i\right]$$

The price $p_i$ is always smaller than the original bid b; since $b_{i+1} * ci_{+1} * s_{i+1} < b_i * c_i * s_i$. The price $p_i$ also has the desirable property of no subsequent regret for the advertiser. That is, if the advertiser would have chosen a bid smaller than $b_i$, the advertiser would still win the same slot. This is true as long as the advertiser's bid is larger than $p_i$. If the bid amount $b_i$ is charged to the advertiser, after the fact the advertiser would regret not bidding $p_i$ plus one cent. If instead we charge the advertiser $p_i$ to begin with, the incentive to out-guess the system is reduced and advertiser satisfaction is increased. The advertiser would still need to check whether a different slot would be a better fit, though. Periodic bid adjustments are recommended.

In some embodiments, only cost per click (CPC) bids are accepted for advertising items and content items. In other embodiments, however, cost per impression (CPM) bids may be accepted as well. When CPM bids are accepted, the desired allocation of bids to slots is required to place ads with higher expected revenue in higher slots, where a CPC ad a placed in slot k is assumed to have expected revenue $b_a * c_a * \text{refCTR}(k)$. When all bids are CPC bids, this allocation goal is achieved by simply sorting the advertising items according to $b_a * c_a$ since refCTR(k) is advertisement independent and therefore can be omitted. This makes the computation of the allocation of bids relatively quick and straightforward.

On the other hand, the revenue of a CPM ad does not depend in any way on its clickability or on its slot. The advertiser pays its bid whenever the ad is being displayed. Simply sorting CPC and CPM bids according to bid value (or bid amount multiplied by clickability) will no longer satisfy the property of higher revenue bids getting a higher position in the stream.

However, the following approach may be used to jointly rank the two types of advertising items in one pass over slots, still satisfying the above revenue requirement, and without computational slow down. Thus, there does not have to be any technical limitation in allowing both CPM and CPC ads being offered.

The proposed algorithm is as follows.

Input:

1. sorted CPC slate (in order of bid x clickability), x1> x2> ... >$x_n$ 2. refCTRs (position-dependent, ad independent) a1> a2> ...

3. sorted CPM slate (in order of bid) y>Y2> ... >Ym

For each slot k (starting with the highest slot, 1),

Let X be the highest-ranked CPC advertising item that isn't assigned yet

Let Y be the highest-ranked CPM advertising item that isn't assigned yet

If X*$a_k$>Y, then assign X to slot k, else assign Y to slot k.

The pricing technique may be varied for inclusion of CPM ads, as well. For a CPM ad, price is set at (bid*clickability of the CPM advertising item or content item below OR CPM of ad below). For a CPC ad, price is set at (bid*clickability of the advertising item or content item below)/(clickability of the CPC advertising item) If the advertising item below is CPC, OR price is set to (bid/refCTR of advertising item below)/(clickability of the CPC advertising item) if ad below is CPM.

This technique satisfies the above ranking-by-revenue requirement. The run time and latency are not affected, since sorting time is the dominant factor here and sorting is being done even for CPC-only bids.

Figure 4:
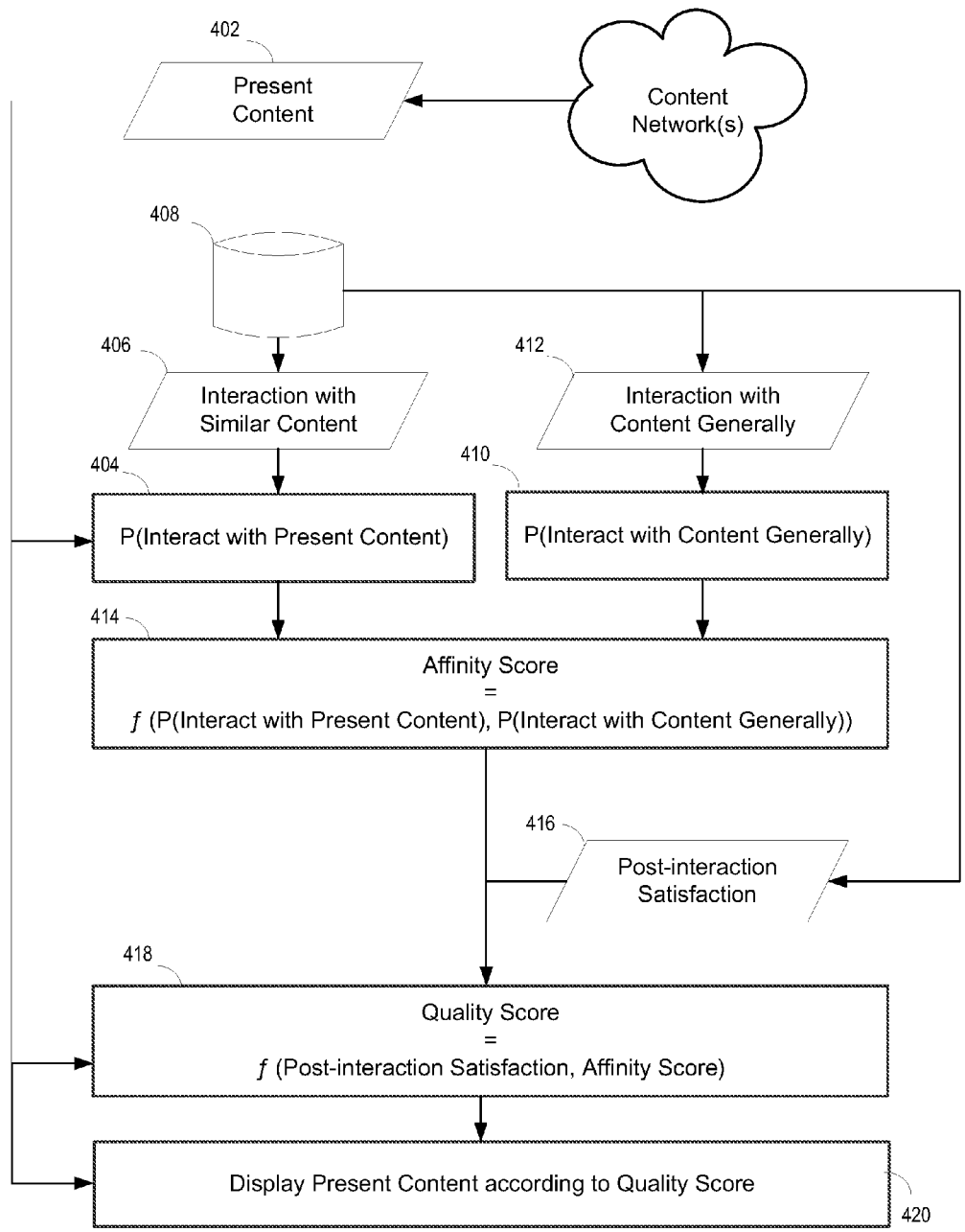
FIG. 4 is an example process for displaying content in a streaming media feed according to a quality score computed using clickability and post-click satisfaction scores.

Illustrated in FIG. 4 is an example process for displaying content in a streaming media feed according to a quality score. Also illustrated is an example process for determining the quality score. In one example, a user of an electronic device, such as a mobile device, may be viewing content, such as news articles, in a streaming media feed. The content (e.g., news articles) may be interlaced with advertisements in the feed as in the exemplary illustration of FIG. 2. For example, the user may view a news article, and when or after the article is viewed, the user may request a next article; however, prior to that next article, an advertisement may appear in the feed. In general, the order in which advertisements and articles appear in the feed may be arbitrary or be determined by a factor, such as a quality score.

In one example, the ranking engine of 116 of the online information system 100 implements a quality scoring system (QSS), the operation of which is shown schematically in FIG. 4. A processor of the ranking engine 115 cooperates with data stored in, for example, the ad database 110 and the content databae 114, to perform the following data processing operations of the QSS.

The QSS receives information, designated in FIG. 4 as present content 402, such as an advertisement or an article, to be scored by the QSS. The present content 402 may be received from a content source via a network, such as the Internet. The QSS may include an interface, such as an optical or electrical transceiver, configured to receive data defining the present content 402 from a streaming media feed or any other type of online feed. The content source may be any source of advertisements or multi-media content, such as a network of servers hosting content configured to feed online content.

Upon receiving the present content in the streaming media feed, for example via the interface of the QSS, a processor of the QSS communicatively coupled to the interface may determine or be configured to determine a first probability at 404, which is a probability a user will select to interact with the item of present content in the streaming media feed. In one example, the item of present content may be an advertising item or a content item as described and illustrated herein, for example in conjunction with FIG. 2.

Regarding the determination of the first probability at 404, selecting to interact with the present advertisement or article may include clicking an advertisement or article or clicking a hyperlink to an advertisement or article. Furthermore, such selecting may include a gesture made with respect to an advertisement or article or a gesture made with respect to a hyperlink to an advertisement or article.

As illustrated, the first probability may be based on data 406, which corresponds to features of the item of present content correlating to a user's prior interactions and/or predilections with content similar to the present content. The interactions and/or predilections may come from a user profile stored in a database, such as database 408. The user profile, for example, may include parameters associated with the user with respect to viewing of streaming media content, for example, and the data 406 may be received by the processor from a database 408 of the QSS.

Upon receiving the present content, the processor may determine or be configured to determine a second probability 410, which is a probability the user will select to interact with content, such as an advertisement or an article, in general, in the streaming media feed. Data 412, which is used as input to determine the second probability 412, may be received by the processor from the database 408 of the QSS.

The processor may also determine or be configured to determine an affinity score of the present content. The affinity score is a relationship between the first determined probability and the second determined probability at 414. The relationship may be represented by a ratio or another type of numerical score, for example. Also, the affinity score may represent a correlation between a user and a present content item based on features of the present content item matching user profile parameters associated with the user.

The affinity score may be independent of a configuration of the present content item in a streaming media feed. For example, the affinity score may be independent of a position of the present content item in a streaming media feed. In other words, the affinity score may not take into account the order in which the present content appears with respect to other content in the streaming media feed.

In one example of the feed, the present content item may be a first content item, such as an advertisement, and a second content item may be an article, such as a news article. In such a case, the first and the second content items may include similar subject matter categorically and the determining of the affinity score may include determining an affinity score of the second content item based on the affinity score of the first content item. In such an example, the similarity of the subject matter categorically may be identified by matching metadata elements embedded in the first and the second content items. The matching metadata elements may include matching categories of a content taxonomy and/or associations with a webpage of a series of webpages provided by a web content provider. In one example, the webpage of a series of webpages provided by a web content provider may be an online encyclopedia or dictionary entry, such as a WIKIPEDIA entry.

In another example of the feed, the determination of the affinity score may include determination of an affinity score between a device, such as a mobile device, of the user and the present content. This affinity score between the user's device and the present content may be based on text in the present content and a present geographic location of the mobile device, for example. This affinity score may also be based on any other attribute of the mobile device, such as a telecommunications service carrier associated with the device, and on any other attribute of the present content, such as a video element of the present content.

In this other example, the processor may determine or be configured to determine the first probability according to a probability a user of the device will select to view the present content item, based on features of the present content item matching profile parameters associated with the user's device and/or the user. Regarding the second probability, the processor may determine it according to a probability a user using the device will select to view a content item, in general, in the streaming media feed. Finally, the processor may determine or be configured to determine the affinity score based on a relationship between the first determined probability and the second determined probability.

In yet another example, the processor may determine or be configured to determine the first or the second probability using a machine learning technique. For example, the processor may determine the first or the second probability using a boosted decision tree or another form of artificial intelligence.

The processor may also identify or be configured to identify data 416 corresponding to post-interaction satisfaction with prior content, such as data regarding post-interaction satisfaction with prior viewed advertisements or articles that match categorically the present content. The data 416 may then be derived into a post-interaction satisfaction score. The categorical matching may include matching by categories of a content taxonomy and/or associations with a webpage of a series of webpages provided by a web content provider such as a provider of an online encyclopedia or dictionary. The data 416 may include data associated with posts regarding the present content or similar content, including social media posts. The data 416 may also include data regarding mouse clicks on the content or similar content or on links to such content. Also, the data 416 may include data regarding views of such content, lengths of viewing such content, registration or subscriptions to view such content, amount of sharing of such content to other users, and linking to such content via the user's own content.

Based on the affinity score and the post-interaction satisfaction data 416 or the post-interaction satisfaction score, the processor may determine or be configured to determine the quality score at 418. For example, the quality score may be determined by computing a product of the affinity score and the post-interaction satisfaction score.

Upon determining the quality score, the score may be used by the processor as a basis for displaying the present content and/or configuring the present content with respect to the feed, such as the order the present content is displayed relevant to other content in the feed. Also, the quality score may be displayed or used in generating reports for administrators, for example.

From the foregoing, it can be seen that the present disclosure provides techniques for an online provider to control the location, number and density of steam ads in a stream of content viewable by a user on a web page. The stream may be viewed as a unified marketplace where both content items and advertising items compete for inclusion in the stream. Scoring and ranking techniques permit commensurate ranking of both content items and advertisement items. Additional business rules for content items and advertising items may further control the relative location of content items and advertisement items in a stream.

The disclosed method and system may be implemented partly in a server, a client device, a cloud computing environment, partially in a server and partially in a client device, or a combination of the server, the cloud computing environment and the client device.

It is therefore intended that the foregoing detailed description be regarded as illustrative rather than limiting, and that it be understood that it is the following claims, including all equivalents, that are intended to define the spirit and scope of this disclosure.

The invention claimed is:

1. A system comprising:
   a processor and a memory;
   an advertisement storage device configured to store data defining a plurality of advertisement items originating with advertisers;
   a content storage device configured to store a plurality of content items originating with sources other than advertisers; and
   a server system in data communication with the ad storage device and the content storage device and configured to display advertisement items retrieved from the ad storage device and content items retrieved from the content storage device as a stream of graphical or textual items arranged in a sequence on a web page and viewable by a user on a user device, the server system further configured to determine respective bid amounts for respective advertisements items and to determine a respective content bid amount for respective content items that allows ranking together the respective advertisement items and the respective content items, the server system further configured to compute respective ranking scores for the respective advertisement items using the determined respective bid amounts and to compute respective ranking scores for the respective content items using the determined respective content bid amounts, the server system further configured to order the ranked advertisement items and the ranked content items together in the stream using the respective ranking scores computed for each respective advertisement item of the plurality of advertisement items and each respective content item of the plurality of content items, the server system further configured to transmit a web page including the stream to a user device over a network.

2. The system of claim 1 wherein the server system is further configured to compute a respective ranking score for each respective advertisement item of the plurality of advertisement items as a product of at least a bid amount and a clickability score reflecting a likelihood of being clicked by a user of the user device independent of the position occupied within the stream.

3. The system of claim 2 wherein the server system is further configured to compute the respective ranking score as a product of the clickability score using a reference click-through-rate value.

4. The system of claim 2 wherein the server system is further configured to compute the respective ranking score as a product of the bid amount, the clickability score and a satisfaction score for the each respective advertisement item.

5. The system of claim 4 wherein the server system is further configured to determine the respective content bid amount for each respective content item by determining a quality score for the each respective content item and using the quality score to determine the respective content bid amount for the each respective content item.

6. The system of claim 5 wherein the server system is further configured to use the quality score to determine a percentile score and to use the percentile score to select a bid amount for an advertisement item having the same percentile score as the respective content bid amount for the each respective content item.

7. The system of claim 2 wherein the server system is configured to detect selection of an ordered advertisement item at a user device and, in response, to charge an account of an advertiser associated with the selected advertisement item an amount equal to a bid amount of a next-lowest-ordered content item or advertisement item in the stream.

8. The system of claim 1 further comprising:
   an account database configured to store account data defining account information for a plurality of advertisers associated with the plurality of advertisement items; and
   an account server in data communication with the account database and the server system, the account server configured to respond to a detected selection at a user device of an ordered advertisement item in the stream by charging an account of an advertiser associated with the selected advertisement item an amount equal to a bid amount of a next-lowest-ordered content item or advertisement item in the stream.

9. The system of claim 1 wherein the server system is further configured to:
compute a clickability score and a post-click satisfaction score for respective content items and respective advertising items;
compute the respective ranking score for each advertising item and each content item using the computed clickability score and the computed post-click satisfaction score for each of the respective advertising items and the respective content items and using the determined respective content bid amount for the respective content items and using an advertiser specified bid amount for the respective advertising items;
using computed ranking scores for each respective advertisement item and each respective content item, position the respective advertisement items having scores greater than processed content items before the processed content items; and
display the respective advertising items with the respective content items as positioned using the computed ranking scores.

10. A method comprising:
in a server system,
retrieving stored advertisement items from an advertisement storage device, the advertisement items originating with advertisers;
retrieving stored content items from a content storage device, the content items originating with sources other than advertisers;
determining respective content bid amounts for respective retrieved content items that allow ranking together the respective retrieved advertisement items and the respective retrieved content items;
determining by a processor content ranking scores for the respective retrieved content items using the respective content bid amounts;
determining by a processor respective advertisement bid amounts for respective retrieved advertisement items;
determining by a processor advertisement ranking scores for the respective retrieved advertisement items using the respective advertisement bid amounts;
ranking by a processor the respective retrieved advertisement items and the respective retrieved content items using the content ranking scores and the advertisement ranking scores;
formatting a web page with a sequence of items viewable on the web page when the web page is displayed on a user device, the sequence of items including the ranked advertisement items and the ranked content items positioned respectively in the sequence of items on the web page according to the ranking; and
transmitting the formatted web page to a user.

11. The method of claim 10 wherein ranking the respective retrieved advertisement items and the respective retrieved content items comprises
scaling the respective retrieved advertisement items to determine a respective advertisement score for each respective retrieved advertisement item;
scaling the respective retrieved content items to determine a respective content score for each respective retrieved content item; and
ordering the respective retrieved advertisement items and respective retrieved content items on the web page using the respective advertisement scores and the respective content scores.

12. The method of claim 10 wherein formatting the web page comprises:
arranging on the web page a stream of advertisement items and content items, the respective retrieved advertisement items and the respective retrieved content items being ordered according to the ranking.

13. The method of claim 10 further comprising:
for each respective retrieved advertisement item, determining a respective advertisement score using a respective advertisement clickability value;
for each respective retrieved content item, determining a respective content ranking score using a respective content clickability value; and
wherein ranking the respective retrieved advertisement items and respective retrieved content items comprises using the determined respective content scores and the determined respective content scores.

14. The method of claim 13 further comprising:
for each respective retrieved advertisement item, determining the respective advertisement clickability value as a ratio of how many more clicks the respective retrieved advertisement item would get to an average number of clicks received by an inventory of advertisement items; and
for each respective retrieved content item, determining the respective content clickability value as a ratio of how many more clicks the respective retrieved content item would receive to an average number of clicks received by an inventory of content items.

15. The method of claim 14 further comprising:
determining a dwell time for the respective retrieved content item; and
determining the post-click satisfaction score using the dwell time.

16. The method of claim 13 wherein determining a respective content score comprises determining the respective content score as a product of a clickability score and a post-click satisfaction score.

17. The method of claim 10 further comprising:
for each respective retrieved advertisement item, determining a respective advertisement bid amount, an advertisement clickability score and an advertisement satisfaction score;
determining a respective advertisement ranking score as a product of the respective advertisement bid amount, the respective advertisement clickability score and the respective advertisement satisfaction score;
for each respective retrieved content item, determining a respective content clickability score and a respective content satisfaction score;
determining a respective content ranking score as a product of the respective content bid amount, the respective content clickability score and the content satisfaction score; and
ranking the respective retrieved advertisement items and respective retrieved content items by comparing the determined respective content scores and the determined respective content scores to order the respective retrieved advertisement items and respective retrieved content items on the web page.

18. The method of claim 17 further comprising:
using a bid amount associated with each respective advertisement, determining a respective advertisement score for each respective retrieved advertisement item;
ordering the respective retrieved advertisement items and respective retrieved content items in a stream on the web page using the respective advertisement scores and the respective content scores;
detecting a click through of a respective advertisement by a user viewing the web page; and
charging an account of an advertiser associated with the clicked respective advertisement an amount equal to a bid amount of a next-lowest-ordered content item or advertisement item.

* * * * *